(12) United States Patent
Tsutsumi (10) Patent No.: US 6,499,683 B1
(45) Date of Patent: Dec. 31, 2002

(54) SPINNING REEL FOR FISHING

(75) Inventor: Wataru Tsutsumi, Saitama (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/654,565

(22) Filed: Sep. 1, 2000

(30) Foreign Application Priority Data

Sep. 1, 1999 (JP) .......................................... 11-247877

(51) Int. Cl.$^7$ ............................................. A01K 89/02
(52) U.S. Cl. ......................... 242/247; 242/297; 192/45
(58) Field of Search ................................ 242/247, 248, 242/249, 297, 301, 293, 299, 300; 192/45

(56) References Cited

U.S. PATENT DOCUMENTS

| | | | | |
|---|---|---|---|---|
| 4,323,203 A | * | 4/1982 | Neufeld ..................... | 188/82.3 |
| 4,520,971 A | * | 6/1985 | Nagata ..................... | 192/18 R |
| 4,614,314 A | * | 9/1986 | Ban ........................... | 242/248 |
| 4,650,134 A | * | 3/1987 | Coucilman ................. | 242/248 |
| 5,350,132 A | * | 9/1994 | Hitomi ....................... | 242/247 |
| 5,547,140 A | * | 8/1996 | Kawabe et al. ............. | 242/247 |
| 5,593,102 A | * | 1/1997 | Yamaguchi ................. | 242/247 |
| 5,645,239 A | * | 7/1997 | Zwayer et al. ............. | 188/82.3 |
| 5,738,292 A | * | 4/1998 | Kang et al. ................. | 242/247 |
| 6,007,012 A | * | 12/1999 | Ito ............................. | 242/247 |
| 6,273,351 B1 | * | 8/2001 | Tsukihiji et al. ............ | 242/247 |

FOREIGN PATENT DOCUMENTS

| | | |
|---|---|---|
| JP | 5219490 | 7/1950 |
| JP | 57197880 | 6/1956 |

* cited by examiner

*Primary Examiner*—Emmanuel Marcelo
(74) *Attorney, Agent, or Firm*—Liniak, Berenato & White (57) ABSTRACT

In a spinning reel for fishing, there is provided a recess (1c) in the leg section (1b) having the fishing rod attaching section (1a) of the reel body (1), and also there is provided a recess (1d) in the reel body (1). The lever-shaped change-over member (4) and the spring (13) are housed in the recess (1c). The lever-shaped change-over member (4) is pivotally supported by the shaft (14) in such a manner that the lever-shaped change-over member (4) can be displaced. The operating section (4b) of the lever-shaped change-over member (4) is arranged in such a manner that it can be pressed down by a finger of the angler's hand holding the fishing rod (15). The acting section (4c) extending forward in the recess (1d) is made to face the reverse rotation preventive claw (7) of the first reverse rotation preventive device (A), and the reverse rotation preventive claw (7) is made to face the first reverse rotation preventive ratchet (5). The reverse rotation preventive claw (9) operated by the spring (3) would round the outer circumference of the drive shaft (2a) of the drive gear (2) is made to face the second reverse rotation preventive ratchet (9) of the second reverse rotation preventive device (B).

4 Claims, 9 Drawing Sheets

SPINNING REEL FOR FISHING

BACKGROUND OF THE INVENTION

The present invention relates to a spinning reel for fishing, the reverse rotation preventive device of which is improved.

Conventionally, when a fishline is drawn out by an angler from a spinning reel for fishing, a bail of the spinning reel is raised and the fishline wound round a spool is engaged with the forefinger of the hand holding a fishing rod, and then the fishline is cast by swinging down the fishing rod with the engagement with the forefinger released so as to draw out the fishline. In order to conduct the above series of operation easily, there is provided a spinning reel for fishing in which not only the normal reverse rotation preventive device (first reverse rotation preventive device) but also another reverse rotation preventive device (second reverse rotation preventive device) capable of engaging and holding a rotor at a constant position, at which the fishline can be engaged by the forefinger of the hand holding the fishing rod, is provided. This spinning reel is disclosed, for example, in Japanese Unexamined Utility Model Publication Nos. 52-19490 and 57-197880.

This spinning reel is composed as follows. A first and a second reverse rotation preventive device are provided in a drive shaft section rotating integrally with a rotor, and a change-over operating member for operating an engaging member, which conducts a reverse rotation preventive action when it is engaged with each of the first and the second reverse rotation preventive device, is provided in a reel body section, so that a state of preventing a reverse rotation can be kept by both the reverse rotation preventive devices.

However, the above spinning reel for fishing is composed in such a manner that the single change-over member provided in the reel body section changes over between the normal reverse rotation preventive state, and the constant position reverse rotation preventive state in which the reverse rotation of the rotor is stopped at a preferable position in the case of drawing out a fishline. Therefore, it is necessary for the angler to pass the change-over member, which is attached to a rear portion of the reel body, from one hand holding the fishing rod to the other hand holding the handle of the reel body. For the above reasons, it is difficult for the angler to operate the change-over member quickly and easily, and further the angler tends to make mistakes in the change-over operation.

Since the change-over member is arranged at the rear of the reel body, dimensions of the rear portion of the reel body tend to increase. Therefore, it is difficult to reduce the dimensions of the spinning reel for fishing.

Problems to be solved by the invention are described as follows. The conventional spinning reel for fishing is composed in such a manner that the single change-over member provided in the reel body section changes over between the normal reverse rotation preventive state, and the constant position reverse rotation preventive state in which the reverse rotation of the rotor is stopped at a preferable position in the case of drawing out a fishline. Therefore, it is necessary for the angler to pass the change-over member, which is attached to a rear portion of the reel body, from one hand holding the fishing rod to the other hand holding the handle of the reel body each time. For the above reasons, it is difficult for the angler to operate the change-over member quickly and easily, and further the angler tends to make mistakes in the change-over operation.

Since the change-over member is arranged at the rear of the reel body, dimensions of the rear portion of the reel body tend to increase. Therefore, it is difficult to reduce the dimensions of the spinning reel for fishing.

SUMMARY OF THE INVENTION

In order to solve the above problems, the present invention has bee accomplished. It is an object of the present invention to provide a spinning reel for fishing in which a change-over operation of the rotor reverse rotation preventive device can be quickly and easily conducted and also an operation to set the rotor at a constant position can be quickly and easily conducted while the fishing rod is being held by an angler.

In order to solve the above problems, the present invention provides, according to a first aspect, a spinning reel for fishing comprising: a rotor rotatably supported by a reel body; a drive mechanism for driving the rotor by operating a handle provided in the reel body; a first reverse rotation preventive device for preventing a reverse rotation of the rotor when a fishline is wound; and a second reverse rotation preventive device for engaging and holding the rotor at a preferable position when the fishline is cast, wherein a change-over operating member for changing over from a normal reverse rotation preventive state made by the first reverse rotation preventive device to a predetermined position engaging state made by the second reverse rotation preventive device is displacably arranged in a leg section having a fishing rod attaching section of the reel body.

The present invention provides, according to a second aspect, a spinning reel for fishing, in which the change-over operating member is urged in one direction, and the reverse rotation preventive state made by the first reverse rotation preventive device is released and the rotor is engaged at a predetermined position by the second reverse rotation preventive device only when an operating section of the change-over operating member is operated.

According to the first aspect, the rotor (6) is set at a predetermined position, which is preferable for the operation of drawing out a fishline, as follows. When the operating section (4b) of the change-over operating member (4) is pressed down by a finger of the hand holding the fishing rod (15) and the fishing rod attaching section (1a) or when the operating section (4b) or the push button (45) of the change-over operating member (4') is lifted up, the function of preventing a reverse rotation by the first reverse rotation preventive device (A) is released, and when the handle (12) is reversed, the rotor (6) can be set at a predetermined position which is preferable for the operation of drawing out a fishline. Without passing the fishing rod (15) and the fishing rod attaching section (1a) from one hand to the other and also without passing the handle (12) from one hand to the other, while the angler is holding the fishing rod 15, it is possible for him to quickly and easily change over the reverse rotation preventive state of the rotor 6.

According to the second aspect of the present invention, when the operating section (4b) of the change-over operating member (4) or the push button (45) is operated by the finger of the angler's hand, the second reverse rotation preventive device B to engage the rotor 6 at a predetermined position which is preferable for the operation of drawing out a fishline functions, and when the operation to operate the change-over operating member (4, 4') or the push button 45 is released, the reverse rotation preventive state is changed over to the normal reverse rotation preventative state in which the first reverse rotation preventive device A is operated. Due to the above simple structure, it is possible to quickly and simply change over between the state in which the fishline is drawn out from the spinning reel and the state in which the fishline is wound by the spinning reel in the case of actual fishing.

DESCRIPTION OF THE PREFERRED EMBODIMENT

Figure 1:
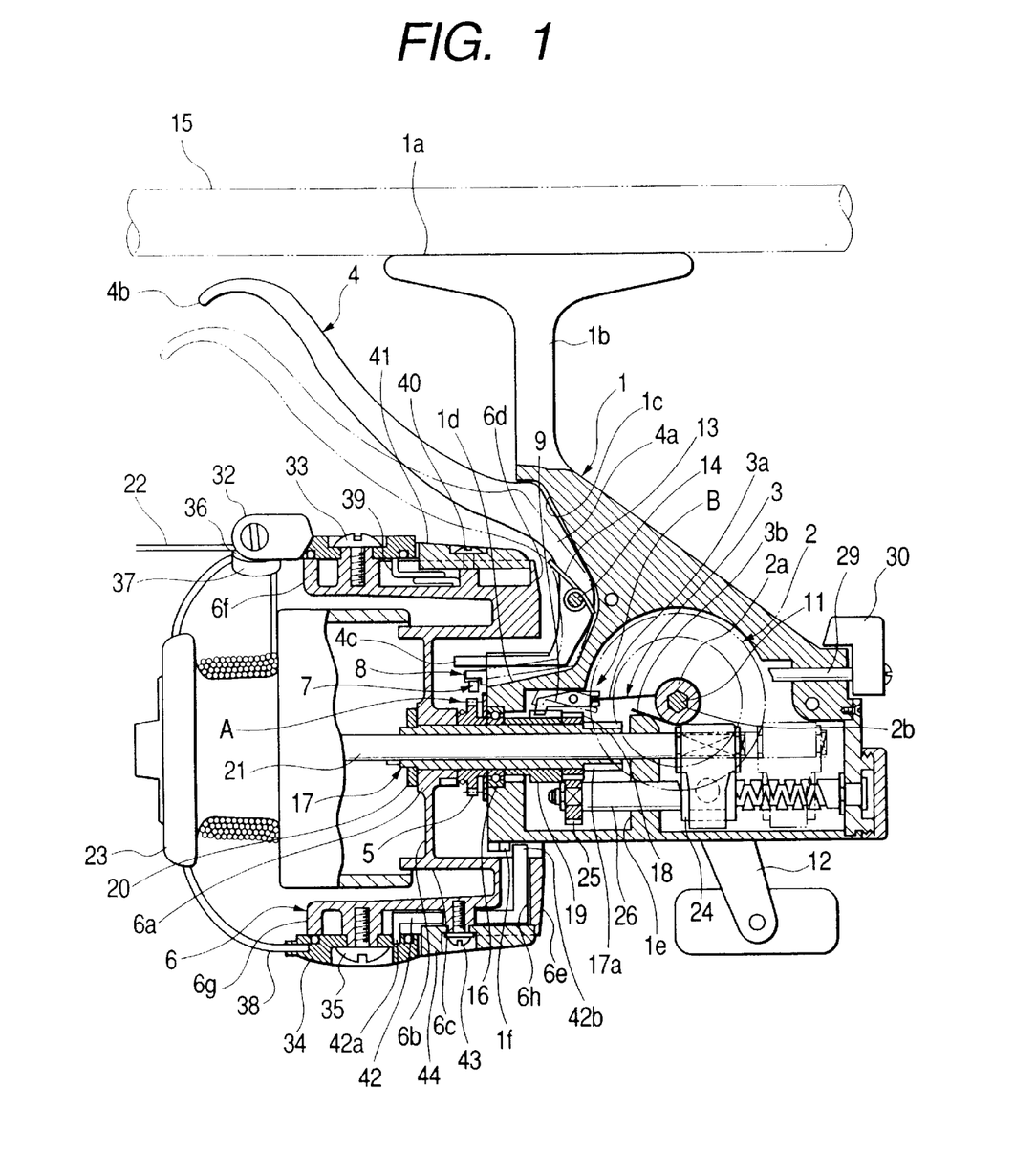
FIG. 1 is a cross-sectional side view showing a spinning reel for fishing of the first embodiment.
Figure 2:
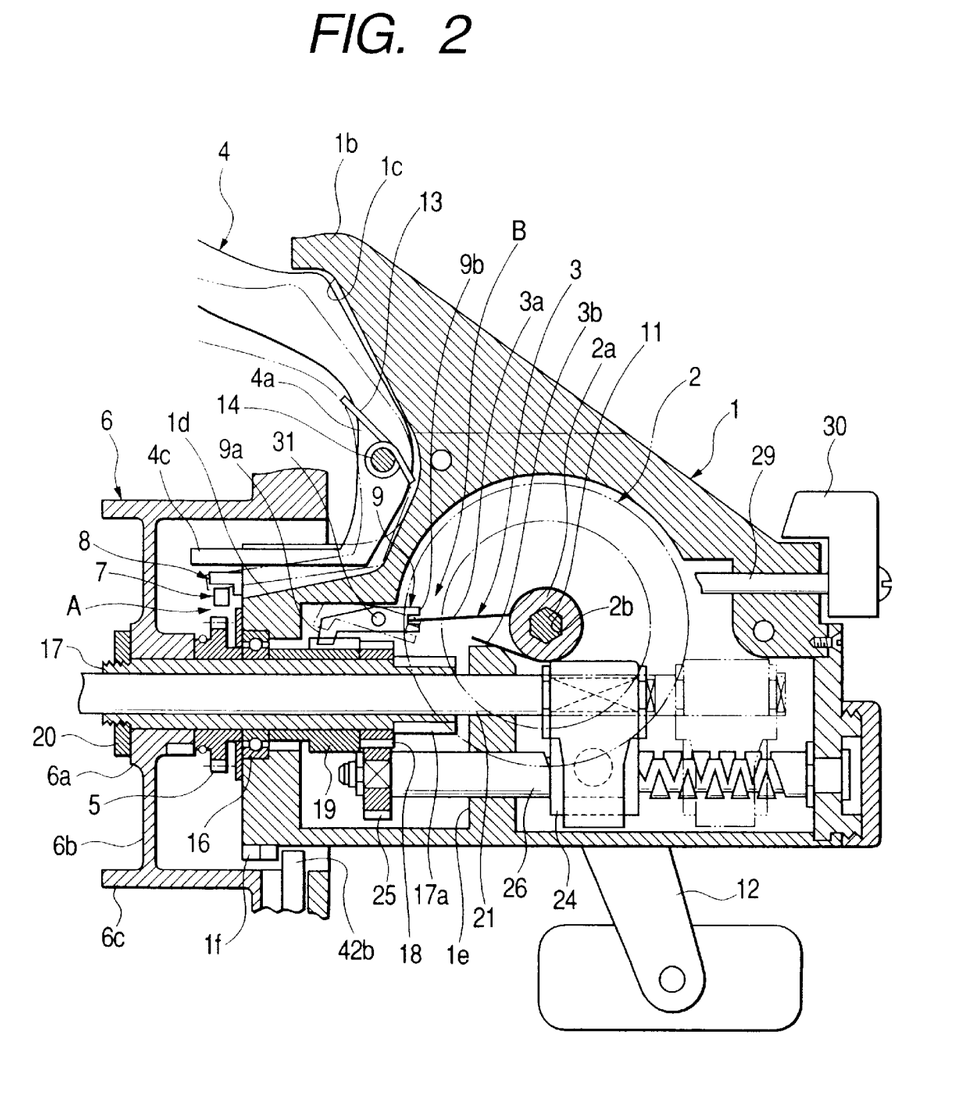
FIG. 2 is an enlarged cross-sectional side view showing a primary portion of the reel body.
Figure 3:
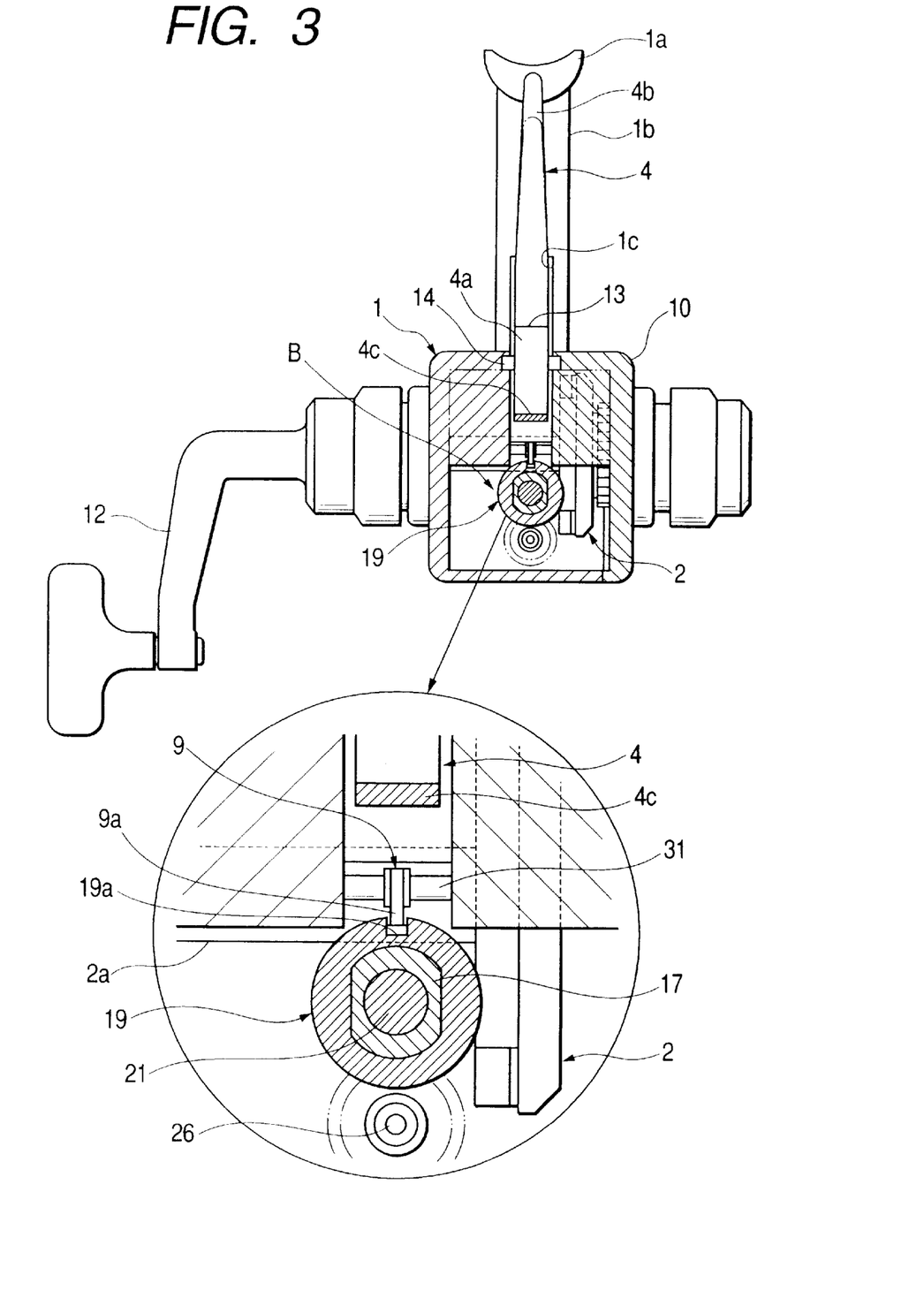
FIG. 3 is a cross-sectional front view and an enlarged cross-sectional front view showing a second reverse rotation preventive device.
Figure 4:
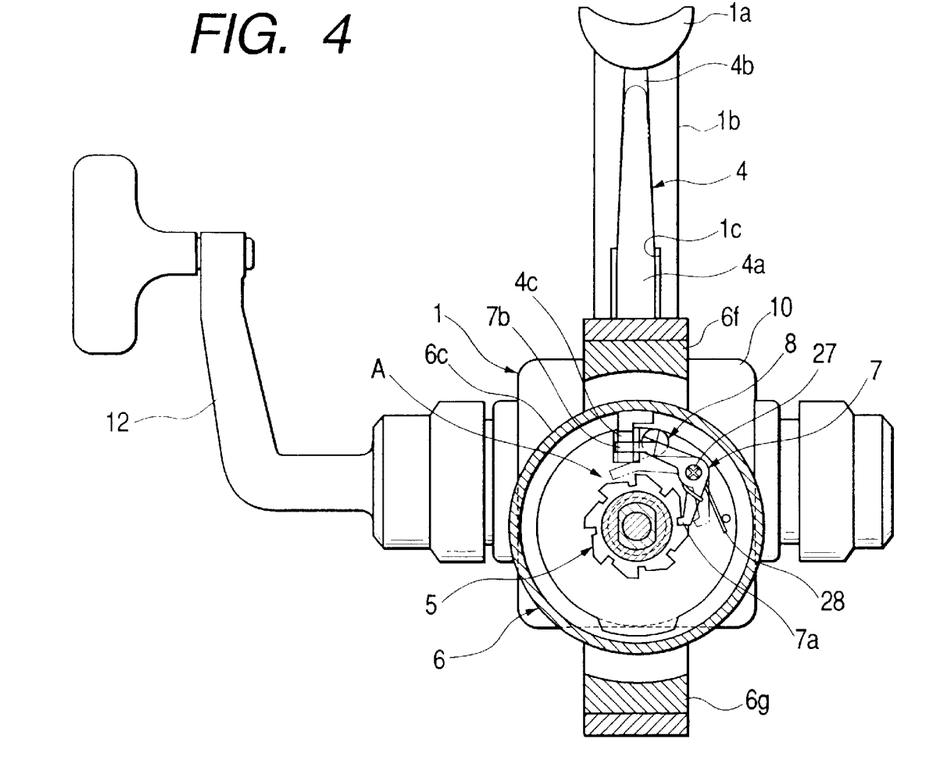
FIG. 4 is a cross-sectional front view showing a first reverse rotation preventive device.
Figure 5:
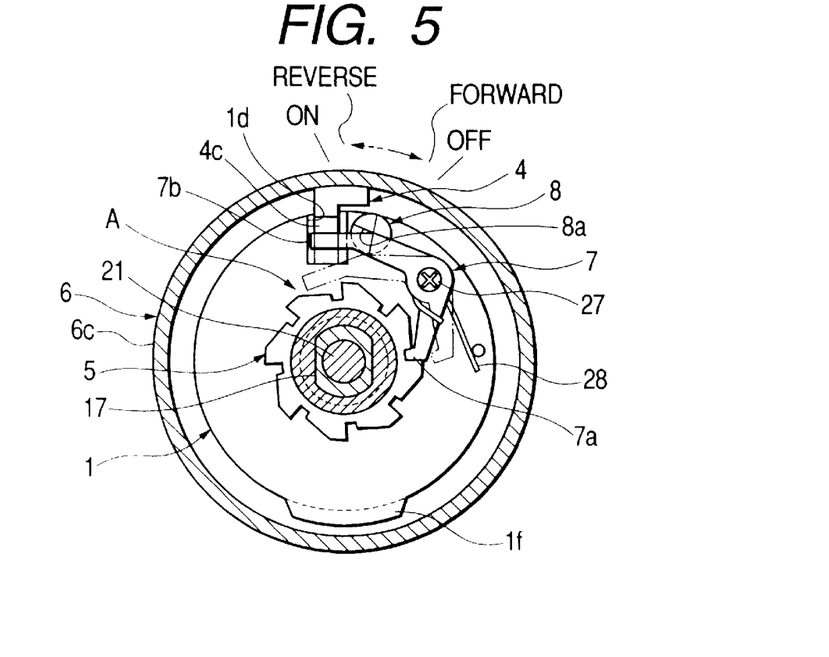
FIG. 5 is an enlarged cross-sectional front view showing the first reverse rotation preventive device.

Referring to the drawings, an embodiment of the present invention will be explained below. FIGS. 1 to 5 are views showing a first embodiment. FIG. 1 is a cross-sectional side view showing a spinning reel for fishing. FIG. 2 is an enlarged cross-sectional side view showing a primary portion of a reel body. FIG. 3 is a cross-sectional front view and an enlarged cross-sectional front view showing a second reverse rotation preventive device. FIG. 4 is a cross-sectional front view showing a first reverse rotation preventive device. FIG. 5 is an enlarged cross-sectional front view showing a primary portion of the first reverse rotation preventive device.

The spinning reel for fishing is arranged and closed in such a manner that the cover 10 is attached to an opening on one side of the reel body 1 by screws not shown in the drawing.

The drive shaft 2a of the drive gear 2 is supported by bearings not shown which are attached to the reel body 1 and the cover 10, and the handle drive shaft 11 is inserted and fixed into the polygonal hole 2b formed at the center of the drive shaft 2a. In this case, the handle drive shaft 11 can be freely replaced from the right to the left or from the left to the right and prevented from being pulled out.

The handle 12 is attached to one end portion of the handle drive shaft 11.

The spring 3 is wound round an outer circumference of the drive shaft 2a, so that the spring 3 is connected with the drive shaft 2a by friction.

On the upper side of the reel body 1, there is provided a leg section 1b having a fishing rod attaching section 1a in such a manner that this leg section 1b protrudes from the upper side of the reel body 1. There is provided a recess 1c on the front face of the base section of the reel body 1. There is provided a recess 1d on the lower side of the recess 1c of the reel body 1.

In the recess 1c, the lever-shaped change-over member 4 and the spring 13 are housed. The lever-shaped change-over member 4 is displacably and pivotally supported by the shaft 14 which is held by the leg section 1b and the cover 10.

The lever-shaped change-over member 4 includes: a shaft supporting section 4a to support the shaft 14; an operating section 4b arranged in such a manner that the operating section 4b can be freely pressed down by the finger of the hand of an angler who is holding the fishing rod 15; and an acting section 4c extending to the front in the recess 1d of the reel body 1.

The spring 13 is wound round the shaft 14, so that the operating section 4b of the lever-shaped change-over operating member 4 can be pushed to an upper position.

The hollow shaft cylinder 17 is supported by the bearing 16, which is arranged at the front portion of the reel body 1, and protruded to the front side.

On the rear side of the bearing 16 of the hollow shaft cylinder 17, the link gear 18 and the second reverse rotation preventive ratchet 19 are engaged with the outer circumference of the hollow shaft cylinder 17 in such a manner that the link gear 18 and the second reverse rotation preventive ratchet 19 can not be rotated with respect to the outer circumference of the hollow shaft cylinder 17. On the front side of the bearing 16, the first reverse rotation preventive ratchet 5 and the central cylindrical shaft 6a of the rotor 6 are engaged with the outer circumference of the hollow shaft cylinder 17 in such a manner that the first reverse rotation preventive ratchet 5 and the central cylindrical shaft 6a are fixed to the outer circumference by the nut 20 so that they can not be rotated with respect to the outer circumference.

At the rear end of the hollow shaft cylinder 17, the pinion 17a is formed, and the drive gear 2 is meshed with the pinion 17a. The rotor 6 is supported so that it can be rotated in accordance with the rotation of the handle 12.

The spool 23 round which the fishline 22 is wound is supported by a forward end portion of the spool shaft 21 protruding to the front side being engaged in the hollow shaft cylinder 17. At the rear end of the spool shaft 21, the sliding piece 24 is fixed after it has been inserted into a through-hole of the bearing section 1e.

The traverse cam shaft 26 is linked and rotated with the link gear 18 via the pinion 25, so that the sliding piece 24, the spool shaft 21 and the spool 23 are linked with the rotation of the handle 12 and reciprocated in the longitudinal direction.

The reverse rotation preventive claw 7 is pivotally supported by the shaft 27 in the front portion of the reel body 1, and the front portion 7a of the reverse rotation preventive claw 7 is pushed by the spring 28 so that the reverse rotation preventive claw 7 can be engaged with the first reverse rotation preventive ratchet 5.

The reverse rotation preventive claw 7 includes a front portion 7a and an operating section 7b.

The operating stick 29 is pivotally attached to the reel body 1, and the cam section 8 is fixed to a forward end portion of the operating stick 29.

The operating knob 30 is attached to the operating stick 29 protruding to the rear outside of the reel body 1.

There is provided a dead point spring not shown in the drawing between the reel body 1 and the operating stick 29 or the cam section 8.

The first reverse rotation preventive ratchet 5, reverse rotation preventive claw 7, spring 28 and cam section 8 compose the first reverse rotation preventive device A.

In the cam section 8, there is provided a cam 8a having a semi-arc section and a cutout portion. When the semi-arc section comes into contact with the operating section 7b of the reverse rotation preventive claw 7, the claw end 7a is separated from the first reverse rotation preventive ratchet 5, and when the cutout portion comes into contact with the operating section 7b of the reverse rotation preventive claw 7, the claw end 7a can be engaged with the first reverse rotation preventive ratchet 5.

When the acting section 4c of the lever-shaped change-over member 4 is made to face the acting section 7b of the reverse rotation preventive claw 7 so that the acting section 4b is pressed down, the acting section 7b is pressed down by the acting section 4c, so that the claw end 7a can be separated from the first reverse rotation preventive ratchet 5.

The second reverse rotation preventive ratchet 19 is composed of one cutout 19a, and the claw end 9a of the reverse rotation preventive claw 9 is made to face the cutout 19a in such a manner that the claw end 9a can be freely engaged with and detached from the cutout 19a.

The reverse rotation preventive claw 9 is pivotally supported by the shaft 31 held by the reel body 1 and the cover 10.

The reverse rotation preventive claw 9 includes a claw end 9a and a spring attaching section 9b. One end 3a of the spring 3 is engaged with the spring attaching section 9b, and the other end of the spring 3 is contacted with the bearing 1e.

When the handle 12 is rotated, the drive shaft 2a of the drive gear 2 is rotated, and the claw end 9a of the reverse rotation preventive claw 9 is engaged with and detached from the cutout 19a of the second reverse rotation preventive ratchet 19 via the spring 3.

The second reverse rotation preventive ratchet 19, reverse rotation preventive claw 9 and spring 3 compose the second reverse rotation preventive device B.

The rotor 6 includes: a central cylindrical shaft section 6a; a front wall 6b; a cylinder section 6c; a pair of base sections 6d, 6e of bail supporting arms extending from the rear side of the cylindrical section 6c in the radial direction; and a pair of bail supporting arms 6f, 6g extending from the base sections to the front.

One 32 of the bail supporting members is attached to the outside of one 6f of the bail supporting arms by the screw 33, and the other bail supporting member 34 is attached to the outside of the other bail supporting arm 6g by the screw 35, and these bail supporting members are attached so that they can be freely inverted between the fishline winding position shown by a solid line and the fishline drawing-out position not shown in the drawing.

The attaching section 37 of the fishline guide roller 36 is attached to one 32 of the bail supporting members.

The bail 38 is attached to between the other bail supporting member 34 and the attaching section 37 of the fishline guide roller 36.

In the recess of one 6f of the bail supporting arm, there is provided a torsion spring 39. One end of the torsion spring 39 is engaged in the hole of one 32 of the bail supporting member, and the other end of the torsion spring 39 is engaged with the bail support arm 6f. Therefore, one 32 of the bail support members, the other bail support member 34, the attaching section 37 of the fishline guide roller 36, and the bail 38 are put into the fishline winding position and the fishline drawing-out position being pushed by the torsion spring 39. The torsion spring 39 is covered with the cover 41 fixed by the screw 40.

In the recess of the other bail support arm 6g, there is provided an inner kick lever 42. One end 42a of the inner kick lever 42 is inserted into a hole formed on the bottom face of the other bail support member 34. Due to the foregoing, what is called an inner kick inversion mechanism is composed, and the inner kick lever 42 is covered with the cover 44 fixed by the screw 43.

The other end 42b of the inner kick lever 42 is inserted into the through-hole 6h formed in the base section 6e on the other bail support arm 6g side and protruded onto the reel body 1 side.

In the reel body 1, there is provided an inversion protrusion 1f.

In order to prevent the rotor 6 from reversing when the fishline is wound, the operating knob 30 is turned, so that the first reverse rotation preventive ratchet 5 of the first reverse rotation preventive device A and the claw end 7a of the reverse rotation preventive claw 7 are engaged with each other. In this way, there is prepared a normal reverse rotation preventive state.

When the rotor 6 is set at a predetermined position which is preferable for the operation to draw out the fishline, that is, when the fishline guide roller 36 is set at an upper position as shown in FIG. 1, the operating section 4b of the change-over operating member 4 is pressed down, and the handle 12 is rotated in a direction opposite to the fishline winding direction.

When the operating section 4b of the change-over operating member 4 is pressed down, the acting section 7b of the reverse rotation preventive claw 7 is pressed down in the acting section 4c, so that the claw end 7a is separated from the first reverse rotation preventive ratchet 5, and when the rotor 6 can be reversed, the handle 12 is rotated. Then, the claw end 9a of the reverse rotation preventive claw 9 of the second reverse rotation preventive device B is engaged with the cutout 19a of the second reverse rotation preventive ratchet 19. In this way, the rotor 6 can be set at a predetermined position which is preferable for the operation to draw out the fishline.

When the pressing down of the operating section 4b of the change-over operating member 4 is released and the handle 12 is rotated in the fishline winding direction, the claw end 9a of the reverse rotation preventive claw 9 of the second reverse rotation preventive device B is disengaged from the cutout 19a of the second reverse rotation preventive ratchet 19 by the action of the spring 3. Therefore, the claw end 7a of the reverse rotation preventive claw 7 of the first reverse rotation preventive device A is separated from the first reverse rotation preventive ratchet 5. In this way, the rotor 6 can be rotated.

When the fishline 22 is drawn out by the bite of a fish under the above condition, the rotor 6 is reversed, and the claw end 7a of the reverse rotation preventive claw 7 is engaged with the first reverse rotation preventive ratchet 5, and the rotor 6 is prevented from reversing.

When the spinning reel for fishing is composed as described above, the change-over operation to change over a reverse rotation preventive state of the rotor 6 can be conducted quickly and easily as follows. When the rotor 6 is set at a predetermined position which is preferable for the operation to draw out the fishline, the operating section 4b of the change-over operating member 4 is pressed down by the finger of the angler's hand holding the fishing rod 15 and the fishing rod attaching section 1a. Then, the reverse rotation preventive function of the first reverse rotation preventive device A is released. When the handle 12 is reversed, the rotor 6 can be set at a predetermined position which is preferable for the operation to draw out the fishline by the second reverse rotation preventive device B when the fishline is drawn out. Without changing between the hand, which holds the fishing rod 15 and the fishing rod attaching section 1a, and the hand which grips the handle 12, while the fishing rod 15 is being held by the angler, the change-over operation to change over the reverse rotation preventive state of the rotor 6 can be conducted quickly and easily.

The change-over can be conducted by the following simple change-over structure. In the case of operating the operating section 4b of the change-over operating member 4 with the finger of the angler's hand, the second reverse rotation preventive device B functions, by which the rotor 6 is engaged at a predetermined position which is preferable for the operation to draw out the fishline. When the operation of the change-over operating member 4 is released, the state is changed to a normal reverse rotation preventive state, attained by the first reverse rotation preventive device A. Due to the above structure, it is possible to change over the spinning reel between the fishline drawing state and the fishline winding state quickly and simply.

Figure 6:
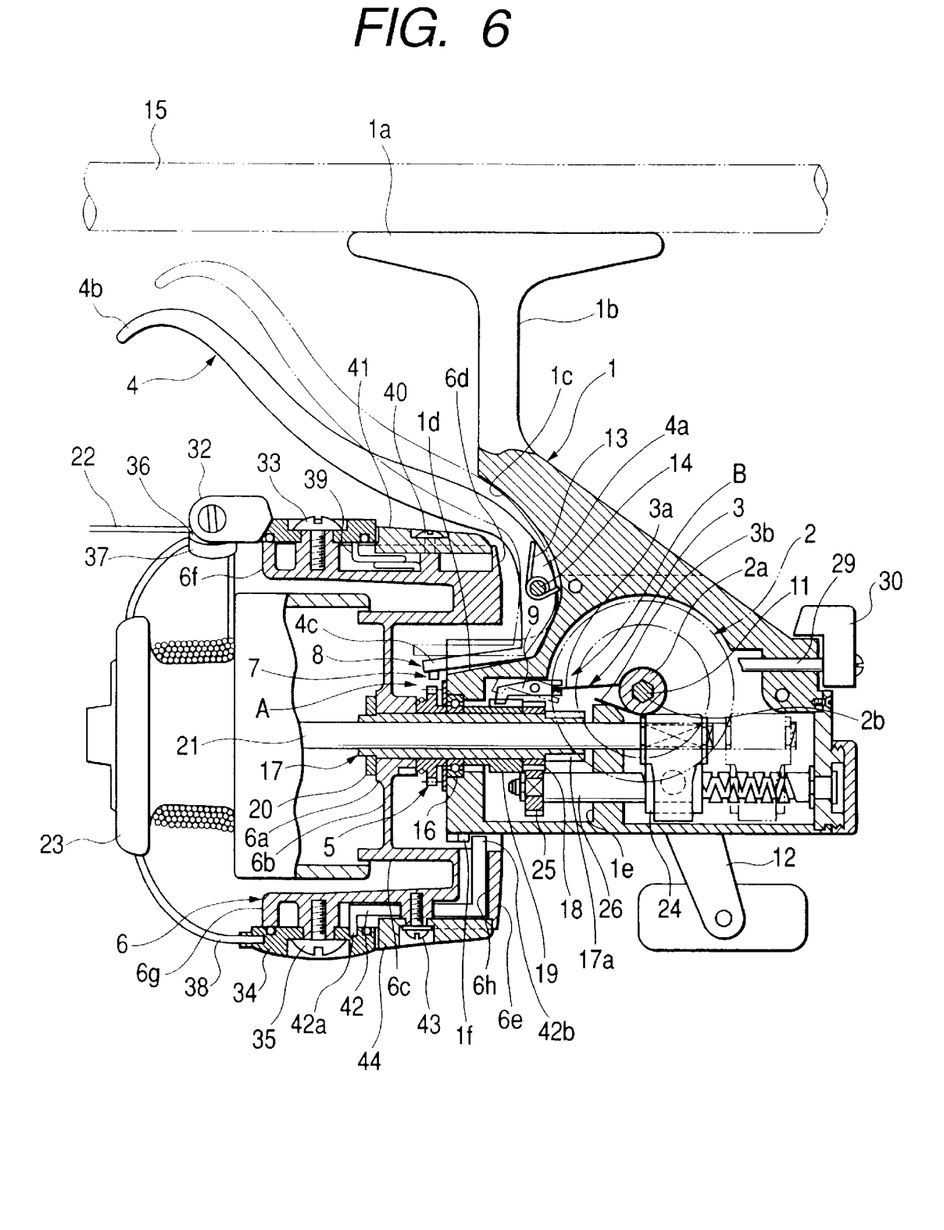
FIG. 6 is a cross-sectional side view showing a spinning reel for fishing of the second embodiment.
Figure 7:
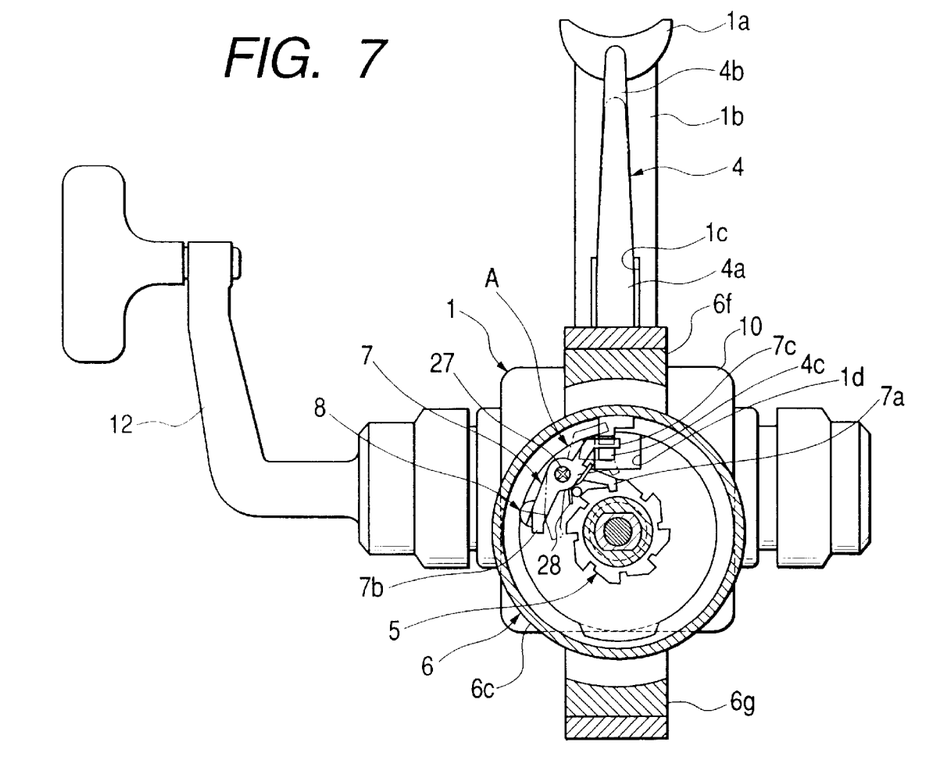
FIG. 7 is a cross-sectional front view showing the first reverse rotation preventive device of the second embodiment.
Figure 8:
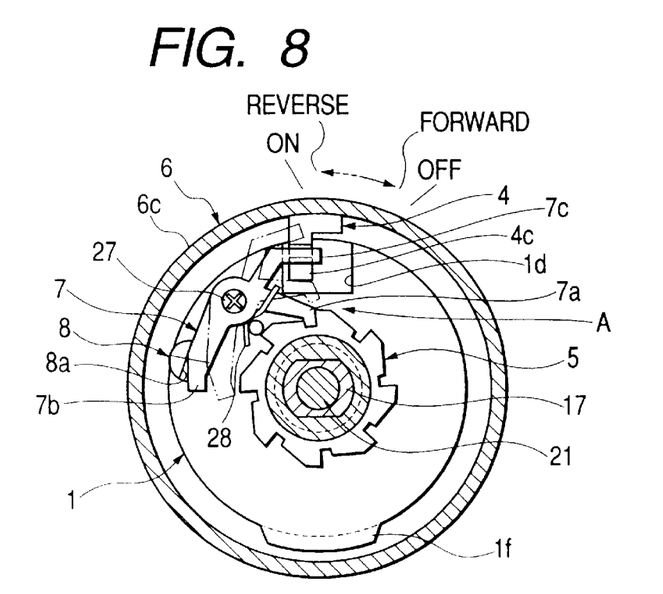
FIG. 8 is an enlarged cross-sectional front view showing a primary portion of the first reverse rotation preventive device of the second embodiment.

FIGS. 6 to 8 are views showing a second embodiment. FIG. 6 is a cross-sectional side view showing a spinning reel for fishing. FIG. 7 is a cross-sectional front view showing the first reverse rotation preventive device. FIG. 8 is an enlarged cross-sectional front view showing a primary portion of the first reverse rotation preventive device.

In the second embodiment, the operating section 4b of the lever-shaped change-over operating member 4 is pushed downward by the spring 13 so that the operating section 4b can be operatively lifted up.

The reverse rotation preventive claw 7 of the first reverse rotation preventive device A includes a claw end 7a, an acting section 7b, and a second acting section 7c.

The acting section 4c of the lever-shaped change-over operating member 4 is made to face the lower side of the second acting section 7c.

Other points of the structure are the same as those of the first embodiment.

In the second embodiment, in order to set the rotor 6 at a predetermined position which is preferable for the operation to draw out the fishline, that is, in order to set the fishline guide roller 36 at an upper position as shown in FIG. 6, the operating section 4b of the change-over operating member 4 is lifted up and the handle 12 is rotated in a direction opposite to the fishline winding direction.

When the operating section 4b of the change-over operating member 4 is lifted up, the second acting section 7c of the reverse rotation preventive claw 7 is lifted up in the acting section 4c, and the claw end 7a is separated from the first reverse rotation preventive ratchet 5. When the rotor 6 can be reversed in this way, the handle 12 is rotated. Then, the claw end 9a of the reverse rotation preventive claw 9 of the second reverse rotation preventive device B is engaged with the cutout 19a of the second reverse rotation preventive ratchet 19, and the rotor 6 is set at a predetermined position which is preferable for the operation of drawing out the fishline.

When the lifting of the operating section 4b of the change-over operating member 4 is released and the handle 12 is rotated in the fishline winding direction, the claw end 9a of the reverse rotation preventive claw 9 of the second reverse rotation preventive device B is disengaged from the cutout 19a of the second reverse rotation preventive ratchet 19, and the claw end 7a of the reverse rotation preventive claw 7 of the first reverse rotation preventive device A is separated from the first reverse rotation preventive ratchet 5, so that the rotor 6 can be rotated.

When the fishline 22 is drawn out by a fish bite under the above condition, the rotor 6 is reversed; and the claw end 7a of the reverse rotation preventive claw 7 is engaged with the first reverse rotation preventive ratchet 5, so that the rotor 6 can be prevented from reversing.

Figure 9:
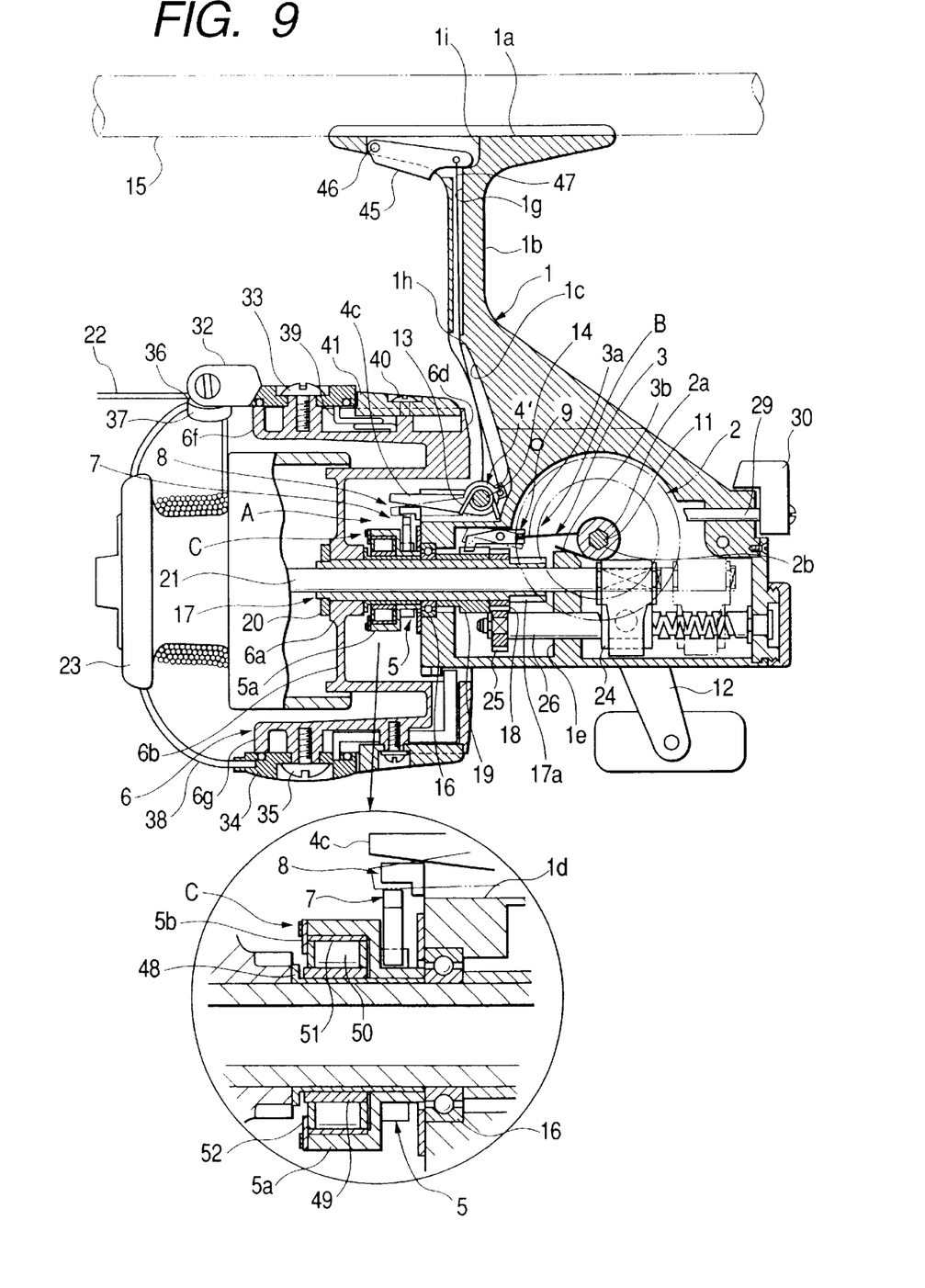
FIG. 9 is a cross-sectional side view and a partially enlarged cross-sectional side view showing a spinning reel for fishing of the third embodiment.
Figure 10:
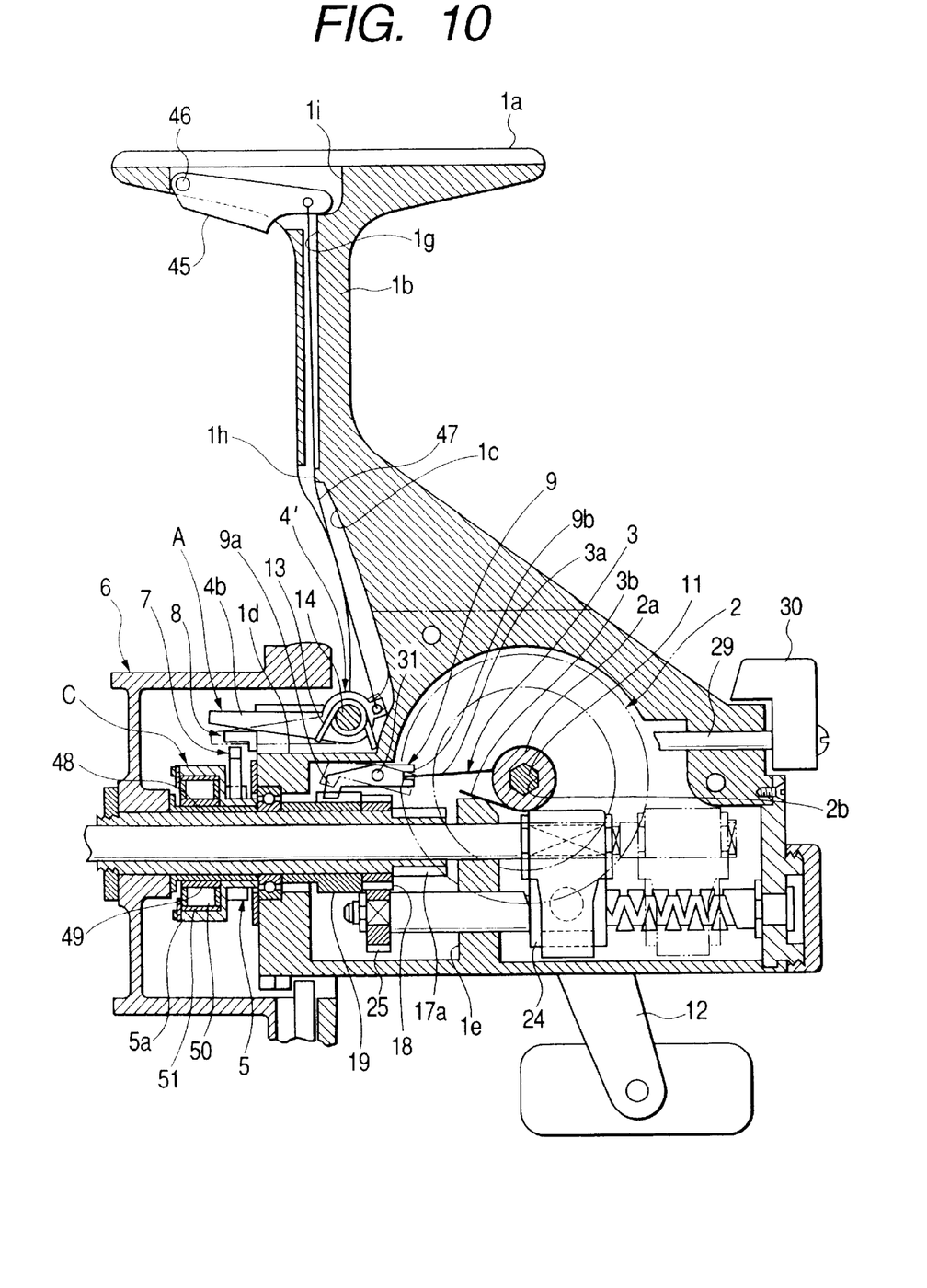
FIG. 10 is an enlarged cross-sectional side view showing a primary portion of a spinning reel body of the third embodiment.
Figure 11:
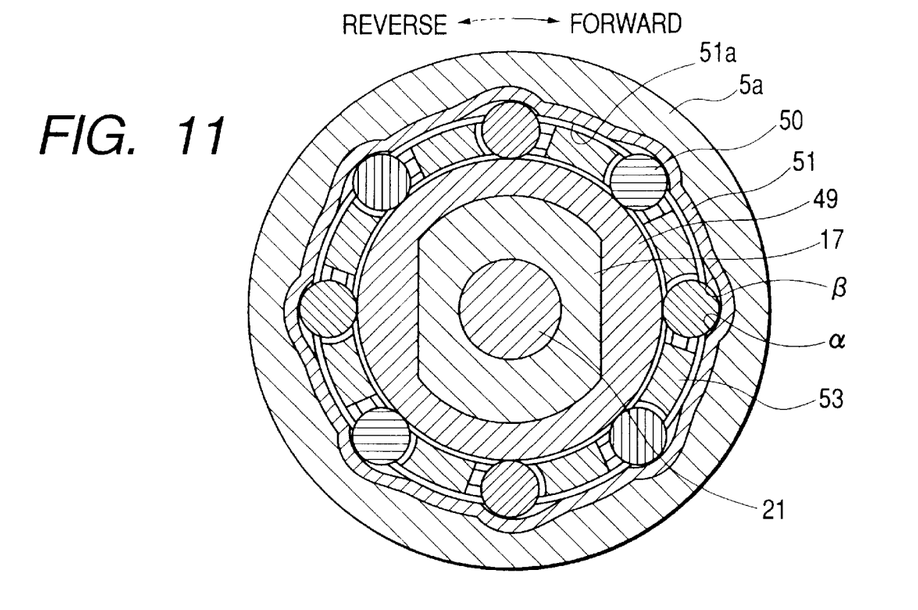
FIG. 11 is an enlarged cross-sectional front view showing a rolling type one way clutch of the third embodiment.
Figure 12:
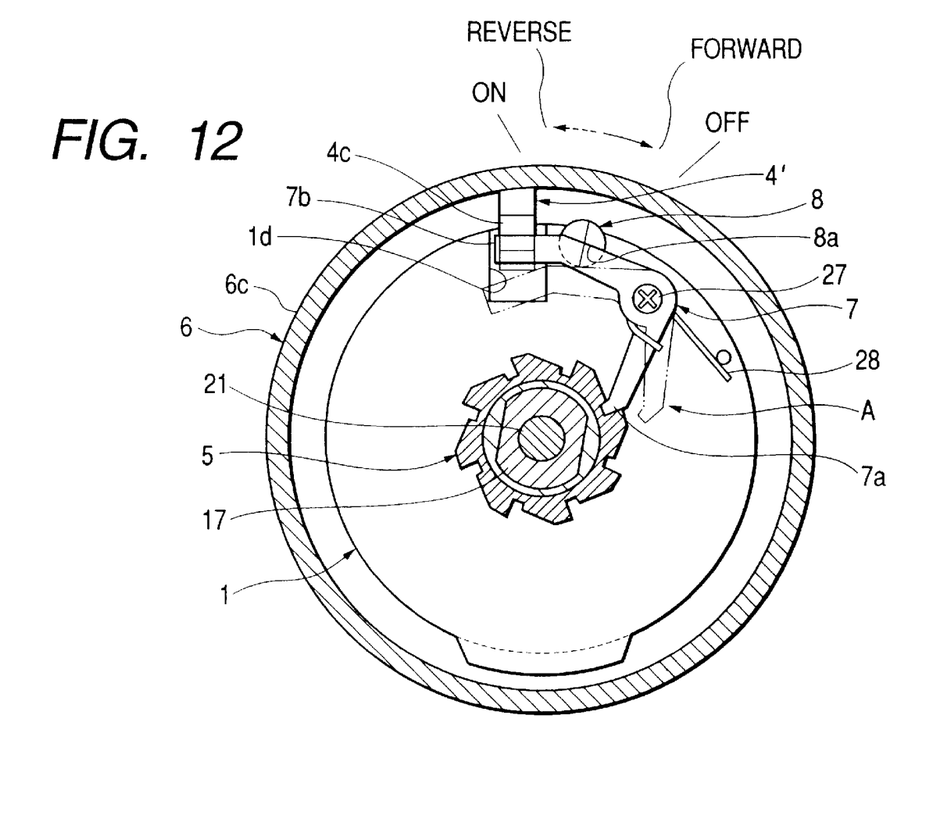
FIG. 12 is an enlarged cross-sectional front view of a primary portion of the first reverse rotation preventive device of the third embodiment.

FIGS. 9 to 12 are views showing the third embodiment. FIG. 9 is a cross-sectional side view and a partially enlarged cross-sectional side view showing a spinning reel for fishing. FIG. 10 is an enlarged cross-sectional side view showing a primary portion of a spinning reel body. FIG. 11 is an enlarged cross-sectional front view showing a rolling type one way clutch. FIG. 12 is an enlarged cross-sectional front view of a primary portion of the first reverse rotation preventive device.

In the third embodiment, the leg section 1b having the fishing rod attaching section 1a is protruded on the upper side of the reel body 1. The recess 1c is formed in the front of the base section. The small longitudinal hole 1g is formed in the leg section 1b, and the protrusion 1h is formed forward at a position where the recess 1c and the longitudinal hole 1g coincide with each other.

The recess 1i is formed in the fishing rod attaching section 1a and one side of the lever-shaped push button 45 is pivotally supported by the shaft 46.

The recess 1d is formed in the reel body 1 on the lower side of the recess 1c, and the lever-shaped change-over operating member 4' and the spring 13 are housed in the recess 1d, and the lever-shaped change-over operating member 4' is pivotally supported by the shaft 14, which is held by the reel body 1 and the cover 10, in such a manner that the lever-shaped change-over operating member 4' can be displaced.

The lever-shaped change-over operating member 4' is pushed by the spring 13 so that the forward end acting section 4c can be lowered.

The wire 47 is provided between the push button 45 and the lever-shaped change-over operating member 4'.

The link gear 18 and the second reverse rotation preventive ratchet 19 are engaged with the outer circumference of the hollow shaft cylinder 17 on the rear side of the bearing 16 under the condition that the link gear 18 and the second reverse rotation preventive ratchet 19 can not be rotated round the hollow shaft cylinder 17. The collar 48 having a flange, the first reverse rotation preventive ratchet 5 and the central cylindrical shaft 6a of the rotor 6 are engaged with the outer circumference of the hollow shaft cylinder 17 on the front side of the bearing 16 under the condition that the collar 48 having a flange, the first reverse rotation preventive ratchet 5 and the central cylindrical shaft 6a of the rotor 6 can not be rotated round the hollow shaft cylinder 17. The collar 48 having a flange, the first reverse rotation preventive ratchet 5 and the central cylindrical shaft 6a of the rotor 6 are fixed to the hollow shaft cylinder 17 by the nut 20.

The cylindrical frame body 5a is formed being integrated with the first reverse rotation preventive ratchet 5.

The inner ring 49 of the rolling type one way clutch C is engaged with the outer circumference of the collar 48 having a flange under the condition that the inner ring 49 can not be rotated round the collar 48, and the rolling member 50 is rotatably set on the outer circumference of the inner ring 49.

The recess 5b is formed in the frame body 5a, and the outer ring 51 of the rolling type one way clutch C is engaged in the recess 5b in such a manner that the outer ring 51 can not be rotated and the outer ring 51 is prevented from being drawn out by the check plate 52.

In the rolling type one way clutch C, the retainer 53 is attached inside the outer ring 51, and the rod-shaped rolling members 50, which conduct a wedge action, are accommodated in a plurality of a accommodating holes of the holder 53.

On the inner circumferential face 51a of the outer ring 51, there is provided a free rotation region α which is a recess and provided for the rod-shaped rolling member 50, and also there is provided a check face β with which the rod-shaped rolling member 50 comes into contact so that the rotation of the rod-shaped rolling member 50 can be checked.

Other point of the structure are the same as those of the first embodiment.

In the third embodiment, in order to set the rotor 6 at a predetermined position which is preferable for the operation to draw out the fishline, that is, in order to set the fishline guide roller 36 at an upper position as shown in FIG. 9, the push button 45 is lifted up and the change-over operating member 4' is rotated via the wire 47, and the handle 12 is rotated in a direction opposite to the fishline winding direction.

When the push button 45 is lifted up and the change-over operating member 4' is rotated, the acting section 7b of the reverse rotation preventive claw 7 is pressed down by the acting section 4c, and the claw end 7a is separated from the first reverse rotation preventive ratchet 5. When the rotor 6 can be reversed in this way, the handle 12 is rotated. Then, the claw end 9a of the reverse rotation preventive claw 9 of the second reverse rotation preventive device B is engaged with the cutout 19a of the second reverse rotation preventive ratchet 19, and the rotor 6 is set at a predetermined position which is preferable for the operation of drawing out the fishline.

When the lifting of the push button 45 is released and the handle 12 is rotated in the fishline winding direction, the claw end 9a of the reverse rotation preventive claw 9 of the second reverse rotation preventive device B is disengaged from the cutout 19a of the second reverse rotation preventive ratchet 19, and the claw end 7a of the reverse rotation preventive claw 7 of the first reverse rotation preventive device A is separated from the first reverse rotation preventive ratchet 5, so that the rotor 6 can be rotated.

When the fishline 22 is drawn out by a fish bite under the above condition, the rotor 6 is reversed, and the claw end 7a of the reverse rotation preventive claw 7 is engaged with the first reverse rotation preventive ratchet 5, so that the rotor 6 can be prevented from reversing.

Referring to FIG. 11, the motion of the rolling type one way clutch C will be described as follows. When the hollow shaft cylinder 17 is rotated clockwise, the rolling member 50 is located in the free rotation region α so that the rolling member 50 is put into an unoperated condition in which the wedge action is not conducted, and the hollow shaft cylinder 17 can be normally rotated clockwise.

Next, when the hollow shaft cylinder 17 is rotated counterclockwise, the rolling member 50 is located on the check surface β so that the rolling member 50 is put into an operated condition in which the wedge action is conducted, and the hollow shaft cylinder 17 can not be rotated counterclockwise, that is, it becomes impossible for the hollow shaft cylinder 17 to be reversed.

When the claw end 7a of the reverse rotation preventive claw 7 is engaged with the first reverse rotation preventive ratchet 5 at this time, the counterclockwise rotation of the hollow shaft cylinder 17 is quickly checked, and it becomes impossible for the hollow shaft cylinder 17 to be reversed.

When the present invention is executed according to the embodiments described above, it is possible to provide the following effects.

According to the first aspect of the present invention, the change-over operation to change over a reverse rotation preventive state of the rotor can be conducted quickly and easily as follows. When the rotor is set at a predetermined position which is preferable for drawing out the fishline, the operating section of the change-over operating member is pressed down by the finger of the angler's hand holding the fishing rod and the fishing rod attaching section, or the operating section of the change-over operating member or the push button is lifter up. Then, the reverse rotation preventive function of the first reverse rotation preventive device is released. When the handle is reversed, the rotor can be set at a predetermined position which is preferable for operating the fishline to drawn out by the second reverse rotation preventive device. Therefore, without changing between the hand, which holds the fishing rod and the fishing rod attaching section, and the hand which grips the handle, while the fishing rod is being held by the angler, the change-over operation to change over the reverse rotation preventive state of the rotor can be conducted quickly and easily.

According to the second aspect of the present invention, the change-over operation can be conducted by the following simple change-over structure. In the case of operating the operating section of the change-over operating member or in the case of operating the push button with the finger of the angler's hand, the second reverse rotation preventive functions, by which the rotor is engaged at a predetermined position which is preferable for drawing out the fishline from the rotor. When the operation of the change-over operating member is released or when the operation of the push button is released, the state is changed to a reverse rotation preventive state, which is normal, attained by the first reverse rotation preventive device. Due to the above structure, it is possible to change over the spinning reel between the fishline drawing state and the fishline winding state quickly and simply.

What is claimed is:

1. A spinning reel for fishing comprising:
   rotor rotatably supported by a reel body;
   a drive mechanism for driving the rotor by operating a handle provided in the reel body;
   a first reverse rotation preventive device for preventing a reverse rotation of the rotor when a fishline is wound, wherein said first reverse rotation preventive device is actuated by an operating knob;
   a second reverse rotation device for engaging and holding the rotor at a predetermined position preferable to a state in which the fishline is cast; and
   a change-over operating lever member for changing over from a normal reverse rotation preventive state made by the first reverse rotation preventive device to a predetermined position engaging state made by the second reverse rotation preventive device, wherein the change-over operating member is displacably arranged in a leg section having a fishing rod attaching section attachable to a fishing rod, and the change-over operating lever member includes an operating section extends from the leg section so that the operating section can be pressed down by a finger of a hand of an user who holds the fishing rod.

2. A spinning reel for fishing according to claim 1, wherein the change-over operating member is urged in one direction, and the reverse rotation preventive state made by the first reverse rotation preventive device is released and the rotor is engaged at the predetermined position by the second reverse rotation preventive device only when an operating section of the change-over operating member is operated.

3. A spinning reel for fishing comprising:
   a rotor rotatably supported by a reel body;
   a drive mechanism for driving the rotor by operating a handle provided in the reel body;
   a rolling type one way clutch for preventing a reverse rotation of the rotor when a fishline is wound, wherein said rolling type one way clutch is actuated by an operating knob;
   a reverse rotation preventive device for engaging and holding the rotor at a predetermined position preferable to a state in which the fishline is cast; and
   a change-over operating member for changing over from a normal reverse rotation preventive state made by the rolling type one way clutch to a predetermined position engaging state made by the reverse rotation preventive device, the change-over operating member being displacably arranged in a leg section having a fishing rod attaching section.

4. The spinning reel for fishing to claim 3, wherein the rolling type one way clutch comprises:
   an inner ring attached to the rotor so as to prevent a rotation therebetween;
   an outer ring into which the inner ring is inserted, wherein a rotation of the outer ring with respect to the reel body is controlled by the change-over operating member;
   a retainer attached between the inner ring and the outer ring and including a plurality of accommodating holes; and
   a plurality of rolling members accommodated in the plurality of accommodating holes, respectively, and conducting a wedge action between the inner ring and the outer ring so that the reverse rotation of the rotor is prevented when the fishline is wound.

* * * * *